(12) United States Patent
Bar-Or

(10) Patent No.: US 7,124,222 B2
(45) Date of Patent: Oct. 17, 2006

(54) CONTROL SYSTEM AND METHOD FOR A COMMUNICATIONS INTERFACE

(75) Inventor: Shahar Bar-Or, Ramat-Hasharon (IL)

(73) Assignee: 1X1 Mobile, Ltd., (IL)

( * ) Notice: Subject to any disclaimer, the term of this patent is extended or adjusted under 35 U.S.C. 154(b) by 44 days.

(21) Appl. No.: 10/736,927

(22) Filed: Dec. 16, 2003

(65) Prior Publication Data

US 2005/0132111 A1 Jun. 16, 2005

(51) Int. Cl.
*G06F 13/00* (2006.01)

(52) U.S. Cl. .................................. 710/106
(58) Field of Classification Search ............. 710/106, 710/18, 21, 45, 301
See application file for complete search history.

(56) References Cited

U.S. PATENT DOCUMENTS

| | | | | |
|---|---|---|---|---|
| 4,660,170 A | * | 4/1987 | Hui et al. ................... | 710/316 |
| 5,014,236 A | * | 5/1991 | Pogorzelski et al. .......... | 710/66 |
| 5,214,584 A | * | 5/1993 | Dingee et al. ............. | 244/3.11 |
| 5,311,505 A | * | 5/1994 | Antoine ...................... | 370/449 |
| 5,682,508 A | * | 10/1997 | Hocker, III .................. | 709/234 |
| 5,884,102 A | * | 3/1999 | England et al. ............... | 710/62 |
| 5,884,103 A | * | 3/1999 | Terho et al. .................. | 710/72 |
| 6,055,581 A | * | 4/2000 | Berglund et al. ............. | 710/11 |
| 6,101,544 A | * | 8/2000 | Beebe et al. ................ | 709/229 |
| 6,119,180 A | * | 9/2000 | Terho et al. .................. | 710/72 |
| 6,470,404 B1 | * | 10/2002 | Kim ........................... | 710/63 |
| 6,738,858 B1 | * | 5/2004 | Fernald et al. ............. | 710/317 |
| 2002/0087753 A1 | * | 7/2002 | Beasley et al. .............. | 710/38 |
| 2004/0133722 A1 | * | 7/2004 | Croyle et al. ............... | 710/105 |
| 2004/0249999 A1 | * | 12/2004 | Connolly et al. ............. | 710/33 |

OTHER PUBLICATIONS

O'Neill, Brian C., et al., "Serial Communication Circuit with Optimized Skew Characteristics," Jun. 2001, IEEE Communications Letters, vol. 1, No. 6, p. 260-262.*
International Search Report for International Application No. PCT/IB04/03605, mailed Jul. 14, 2005.
Written Opinion of the International Searching Authority for International Application No. PCT/IB04/03605, mailed on Jul. 14, 2005.

* cited by examiner

*Primary Examiner*—Glenn A. Auve
(74) *Attorney, Agent, or Firm*—F. Jason Far-hadian, Esq.; Century IP Group

(57) ABSTRACT

A method for controlling data communications between an external interface and at least first and second universal asynchronous receiver-transmitters (UARTs) respectively associated with first and second microcontrollers is provided.

17 Claims, 4 Drawing Sheets

Mobile Device
200

CONTROL SYSTEM AND METHOD FOR A COMMUNICATIONS INTERFACE

BACKGROUND

1. Field of Invention

The present invention relates generally to external interfaces communicating with a plurality of processing units and, more particularly, to controlling data communications between an external interface and a plurality of universal asynchronous receiver-transmitters (UARTs) each in operational relationship with at least one processor.

2. Copyright & Trademark Notices

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

3. Related Art

Handheld communication and computing devices such as cellular phones and personal digital assistants (PDAs) continue to grow in popularity as the related systems and accessories become more affordable and easier to carry. While the reduction in size of a device makes it more convenient for use, it imposes limitations on system design, specially with respect to the size and number of subsystems and components that can be included on the printed circuit board (PCB) when manufacturing the device.

Generally, a handheld device uses an external communication interface (i.e., external interface) to connect to external devices such as a mouse, a flash burning device, or test equipment. The connection between a processor implemented on the PCB and the external interface is typically established via a universal asynchronous receiver-transmitter (UART). A UART is a system subcomponent that handles asynchronous serial communication. Generally, all computing systems include a UART to manage the serial ports, for example.

Certain mobile devices can include more than one processor and therefore more than one UART enabled chipset (chip), because each chip requires a separate mechanism to connect its processor to the external interface. For example, certain cellular phones have a chipset for handling GSM related communications and another chipset for handling Bluetooth related communications, wherein each chipset includes a microcontroller (i.e., processor) and a respective UART in operational relationship with the microcontroller. In order for each UART to communicate with an external device, an external interface is needed. Implementing an external interface for each UART is undesirable, however, because of the space saving requirements associated with the design of a miniature mobile device.

Other solutions such as adding hardware switches or control devices to manage routing of data between an external device and multiple UARTs are both expensive and impractical. Such solutions require addition of electronic hardware such as control PINs or relays that take up valuable space on the PCB. Further, implementation of such hardware solutions requires redesigning the system and related components. The cost associated with design, manufacture, and upgrade of such systems and components can be considerably high and therefore problematic.

A system and method is needed to overcome the above problems.

SUMMARY

The present disclosure is directed to a system and corresponding methods for controlling communications interfaces and, more particularly, to a system and method for controlling data communications between an external interface and a plurality of universal asynchronous receiver-transmitters (UARTs).

For the purpose of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested.

In accordance with one or more embodiments, a method for controlling data communications between an external interface and at least first and second chips, the first chip having a first universal asynchronous receiver-transmitters (UART), a first microcontroller, and a switching mechanism capable of connecting the first UART and the first microcontroller, and the second chip having a second microcontroller and a second UART connecting the second microcontroller to the first UART is provided. The method comprises monitoring signals communicated to the first chip from at least one of the external interface and the second UART; and communicating data between the external interface and the second microcontroller via the first and second UARTs, in response to the switching mechanism detecting a predetermined signal.

The predetermined signal may be a switch sequence received from at least one of the second UART and the external interface. In one embodiment, data is communicated between the external interface and the first microcontroller, after the switching mechanism has detected that a time-out period has expired. The switching mechanism may be implemented as control software executing over the first microcontroller.

In accordance with another embodiment, a method for controlling data communications between an external interface connected in series to a plurality of chips comprises monitoring signals communicated to a first chip from at least one of the external interface and a second chip from the plurality of chips, wherein the first chip is connected between the external interface and the second chip; and communicating data between the external interface and the second chip via the first chip, in response to a switching mechanism in the first chip detecting a predetermined signal.

In yet another embodiment, a method for controlling data communications between an external interface and at least first and second microcontrollers, wherein the first microcontroller is connectable to first and second universal asynchronous receiver-transmitters (UARTs), via a switch mechanism, and wherein the second microcontroller is respectively connected to a third UART is provided. The method comprises communicating signals from the external interface to the first UART, wherein a switch mechanism monitors the signals for a predetermined signal; routing data from the external interface to the second microcontroller via the first, second and third UARTs, in response to the switch mechanism detecting the predetermined signal; and rerouting data from the external interface to the first microcontroller via the first UART, in response to the switch mechanism detecting the predetermined signal.

In one embodiment, the switch mechanism is implemented as control software executable on the first microcontroller for connecting the first UART to at least one of the first microprocessor and the second UART, respectively based on detecting the predetermined signal. The switch mechanism may be also implemented as a hardware switch or partially in hardware and partially in software.

In accordance with one or more embodiments of the invention, a data communications computing system comprises a first chip comprising a first UART, a second UART, a switch mechanism and a first microcontroller, wherein the first UART is in communication with an external interface and the first UART is connectable to the second UART and the first microcontroller via the switch mechanism; and a second chip comprising a second microcontroller and a third UART connected between the second UART and the second microcontroller; wherein the switch mechanism causes data to be routed between the second microcontroller and the external interface via the first, second and third UARTs, in response to detecting a first logic level. The switch mechanism causes data to be routed between the external interface and the first microcontroller via the first UART in response to detecting a second logic level. The first and second logic levels may have equal values.

In certain embodiments, a method for controlling data communications between an external interface and first and second chips, the first chip comprises first and second universal asynchronous receiver-transmitters (UARTs) and the second chip having a third UART comprises monitoring signals communicated from the external interface to the first UART; and routing data from the first UART to the third UART, via the second UARTs, in response to detecting a switch signal. Signals communicated from the third UART to the second UART are monitored to route data from the third UART to the first UART, via the second UART, in response to detecting a switch signal.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION

A computing system and corresponding computer executable methods, according to an embodiment of the present invention, facilitate and provide a method for controlling data communications between an external interface and multiple universal asynchronous receiver-transmitters (UARTs) respectively associated with multiple microcontrollers. This method may be implemented, in accordance with one embodiment, in a personal area network (PAN) or other type of network.

A PAN is, typically, a close range wireless network in which multiple devices can communicate with one another as soon as a device is situated within the proximate range of another device. The devices in the PAN are generally equipped with low-cost, low-power, short-range radio communication interfaces, supported by well-known wireless communication protocols.

Numerous specific details are set forth to provide a thorough description of various embodiments of the invention. Certain embodiments of the invention may be practiced without these specific details or with some variations in detail. In some instances, features not pertinent to the novelty of the system are described in less detail so as not to obscure other aspects of the invention.

Figure 1:
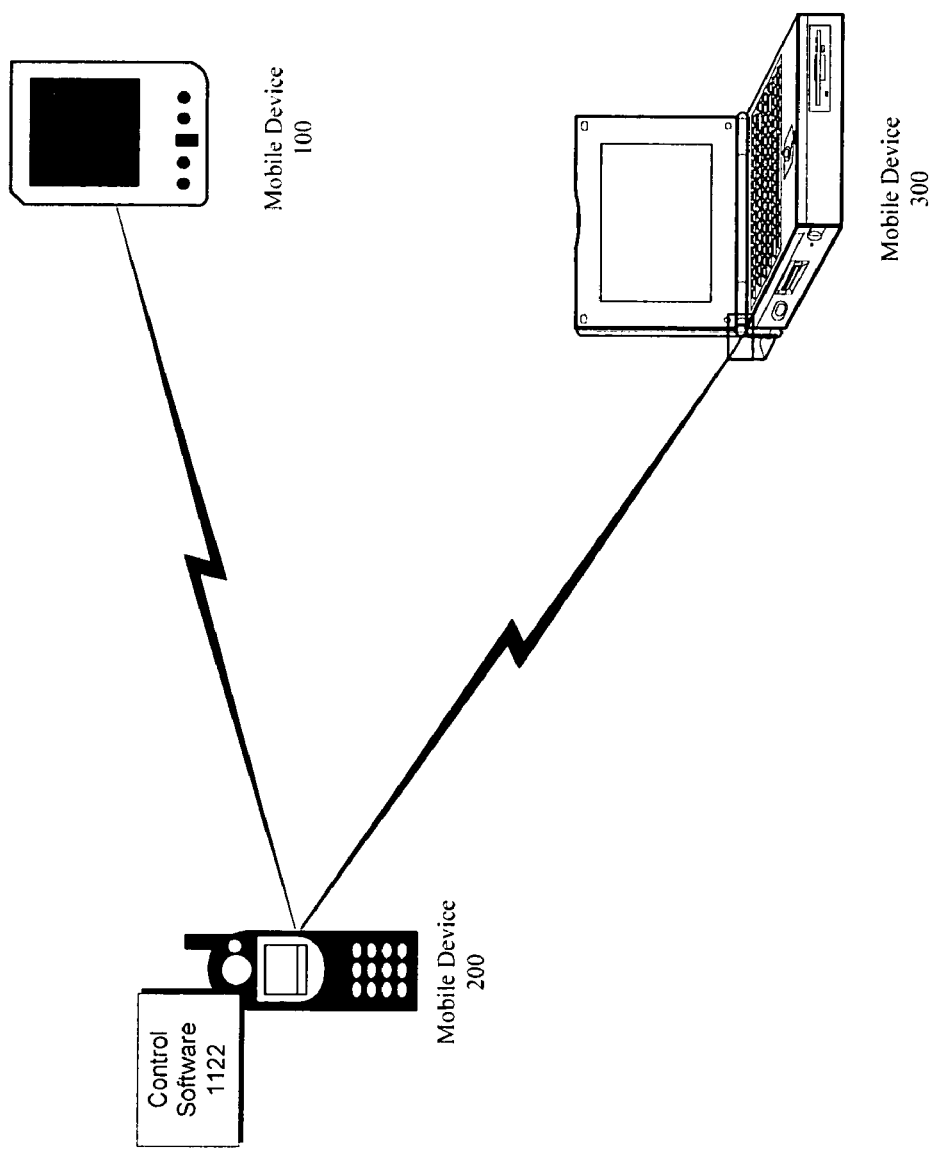
FIG. 1 illustrates an exemplary communication environment between a mobile device and other external devices, wherein the mobile device has multiple universal asynchronous receiver-transmitters (UARTs), in accordance with one embodiment of the invention.

Referring to FIG. 1, in one or more embodiments of the present invention, a plurality of computing systems or devices (i.e., 100, 200, 300) may be arranged in a wired or wireless communications network to receive and transfer information. In alternative embodiments, certain devices may be connected either wirelessly or by wire in a non-network environment to communicate data (i.e., by way of a data cable).

In one embodiment, mobile device 200 may comprise one or more means of wireless communications with a plurality of mobile devices, such as mobile devices 100 and 300. Mobile devices 100 and 300 can be a personal digital assistance (PDA), a laptop computer, a desktop computer, or other computing or processing machines capable of data storage and data communication, for example.

Wireless communication technologies suited for connecting wireless devices in short-range area networks (i.e., IEEE 802.11 or Bluetooth), and long-range area networks (i.e., GSM) and the like may be utilized in other embodiments to connect mobile device 200 to mobile devices 100 and 300, for example. The terms "connected" "coupled," or any variant thereof, mean any connection or coupling, either direct or indirect, between two or more elements. The coupling or connection between the elements can be physical, logical, or a combination thereof.

One of ordinary skill in the art will appreciate that a communications network implemented according to the present invention may advantageously be comprised of one or a combination of various types of networks without detracting from the scope of the invention. Such networks in addition to a PAN can, for example, comprise local area networks (LANs), wide area networks (WANs), public, private or secure networks, value-added networks, interactive television networks, two-way cable networks, satellite networks, interactive kiosk networks, cellular communications networks, personal mobile gateways (PMGs) and/or any other suitable communications network.

In certain embodiments, control software 1122 is executed on mobile device 200 for example, to monitor signals communicated among mobile devices 100, 200 and 300. In certain embodiments, control software 1122 is dedicated to controlling the operation of the internal signal processing components of mobile device 200 for example, as provided in further detail below.

In at least one embodiment, mobile device 200 is a Bluetooth enabled cellular mobile telephone, for example, that in addition to communicating in a short-range wireless network by way of a Bluetooth chipset, is capable of communicating with a base station by way of a modem chipset utilizing cellular communications technologies such as time division multiple access (TDMA), code division multiple access (CDMA), global systems for mobile communications (GSM), general packet radio service (GPRS), wideband CDMA (WCDMA) and other well-known communications technologies.

Mobile device 200 may comprise a PMG device or communicate with a self-contained PMG device. The PMG architecture comprises a PMG server that can wirelessly communicate with a number of PMG enabled devices within the personal area of the user or a PAN. A more detailed description of the PMG architecture is provided in U.S. patent application Ser. No. 09/850399, filed on May 7, 2001, the entire content of which is hereby incorporated by reference here.

As used herein, the terms mobile device, cellular phone and communications network are to be viewed as designations of one or more computing environments that comprise application, client or server software for servicing requests submitted by respective software included in devices or other computing systems connected thereto. These terms are not to be otherwise limiting in any manner. The control software 1122, for example, may be comprised of one or more modules that execute on one or more computing systems, as provided in further detail below.

Figure 2:
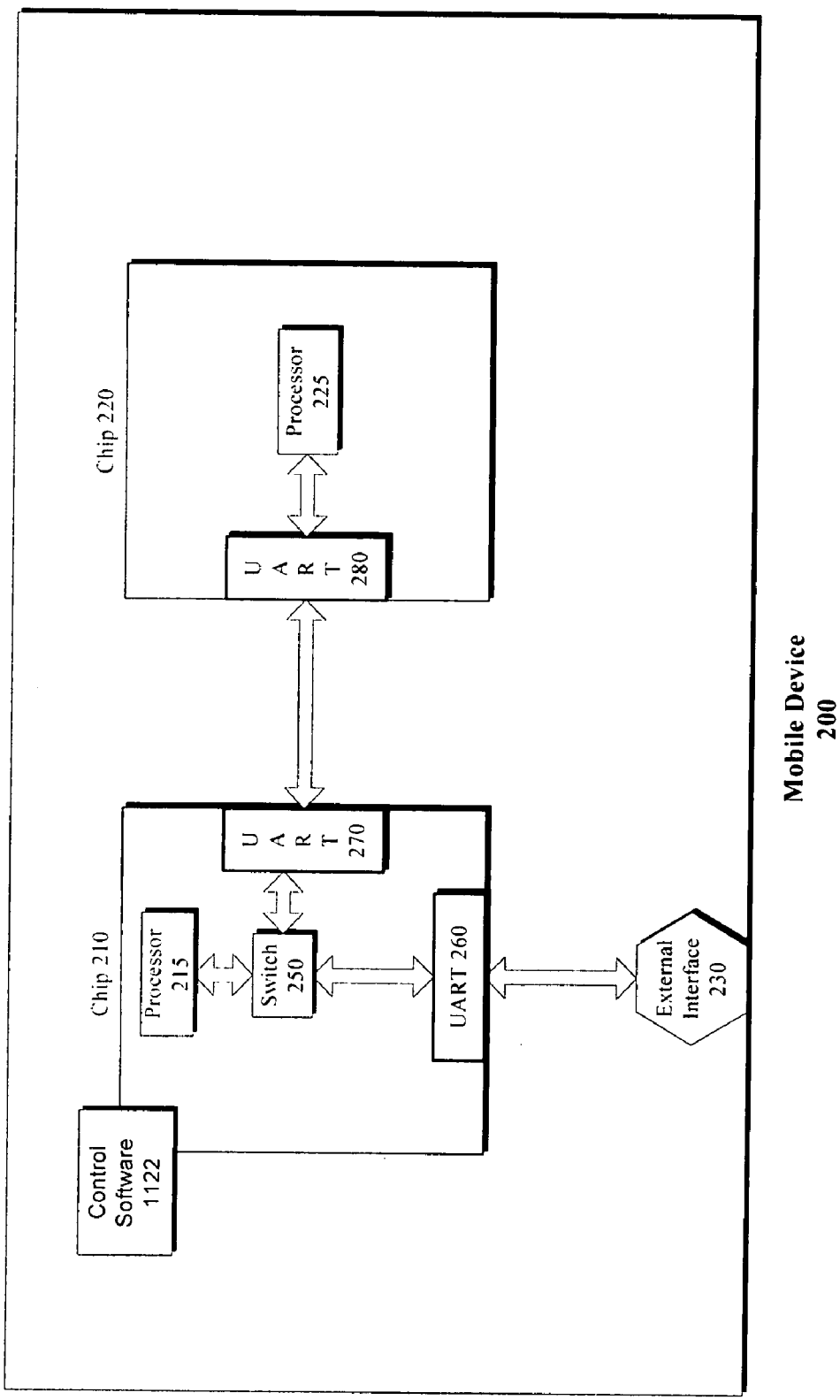
FIG. 2 is a block diagram of a mobile device with multiple UARTs configured to communicate with one external interface, in accordance with one or more embodiments.

Referring to FIG. 2, mobile device 200 comprises one or more processing modules, such as chips 210 and 220. In accordance with one embodiment, chip 210 connects chip 220 to an external interface 230. External interface 230 acts as a communications gateway so that chips 210 and 220 of mobile device 200 can communicate with an external device, such as device 100 or 300, as shown in FIG. 1. For example, mobile device 200 may utilize external interface 230 to transfer data processed by chip 210 to external device 100. Alternatively, mobile device 200 may utilize external interface 230 to transfer data processed by chip 220 to external device 300; or utilize external interface 230 in other well-known data communication scenarios.

In certain embodiments, chips 210 and 220 are UART enabled. In an exemplary embodiment, chips 210 and 220 are respectively Bluetooth and GSM chips. The Bluetooth chip offers fast and reliable digital transmissions of both voice and data over the globally available, unlicensed, 2.4 GHz Industrial, Scientific and Medical (ISM) band and comprises hardware, software and interoperability requirements ideal for the mobile environment. The GSM chip technology is based on TDMA. GSM phones use a Subscriber Identity Module (SIM) smart card that contains user account information to program the GSM chips with user information.

It is noteworthy that chips 210 and 220, in other embodiments of the invention may be any type of UART enabled chip. The Bluetooth and GSM technologies are applied here by way of example. As such, the scope of the invention is not to be construed as limited to such applications.

UART enabled chips 210 and 220 comprise at least UART 270 and 280 respectively. Each chip 210 and 220 also comprises at least a processor 215 and 225, respectively. UARTs 270 and 280 are utilized for handling asynchronous serial transmission between chips 210 and 220. As such, data processed in processors 215 or 225 is routed through UARTs 270 and 280, if data is to be communicated between chips 210 and 220.

In certain embodiments, UARTs 270 and 280 are used to transmit or receive data independent from a clock signal. Timing parameters in form of special bits are added to each communicated signal to synchronize the sending and receiving devices. For example, a bit called the start bit is added to the beginning of each data word that is to be transmitted. The start bit is used to alert the receiver that a word of data is about to be sent, and to force the clock in the receiver into synchronization with the clock in the transmitter.

After the start bit, the individual bits of the word of data are sent, with for example, the least significant bit being sent first. Each bit in the transmission is transmitted for approximately the same amount of time as all of the other bits and the receiving device determines if the bit is a 1 or a 0. The sending device does not know when the receiving unit determines the bit value. The sending device transmits the next bit of the word according to the timing information.

When the entire data word has been sent, the transmitting device may add a parity bit that is used by the receiver to perform error checking. Then, at least one stop bit is sent by the transmitting device. When the receiving device has received all of the bits in the data word, the receiving device checks for the stop bit and the parity bits, if included. If the stop bit does not appear when it is supposed to the UART considers the entire word to be garbled and will report a framing error to the host processor after the data word is read.

In one embodiment, regardless of whether the data was received correctly or not, the UART automatically discards the start, parity and stop bits. If another word is ready for transmission, the start bit for the new word can be sent as soon as the stop bit for the previous word has been sent. Because asynchronous data is sell synchronizing, if there is no data to transmit, the transmission line can be idle.

One embodiment of the invention is disclosed here as applicable to a mobile device that comprises one external interface 230 and two chips 210 and 220, respectively. Alternative embodiments of the invention may comprise any number of UART enabled chips or external interfaces. In a preferred embodiment, however, the number of external interfaces is less than the number of UART enabled chips. That is, less than a one-to-one relationship exists between the chips and the external interfaces. This implementation allows for the preservation of resources and space in a miniature design environment, such as that of mobile device 200.

In the exemplary embodiment illustrated in FIG. 2, a control mechanism such as control software 1122 in conjunction with a switch 250 is implemented to monitor data communications among the chips 210, 220 and external device 230. Such control mechanism allows each chip 210 and 220 to utilize resources such as external interface 230 in distinct time periods and to avoid data collision. In certain embodiments, the control mechanism may be implemented as a hardware switch 250 or from combination of hardware and software components.

Referring back to FIG. 2, in a preferred embodiment, one of the chips for example, chip 210 is designated to perform the data switching and comprises another UART 260 in communication with external interface 230. Control software 1122 is implemented to execute over one or more internal components of chip 210 so that data communicated to or from an external device can be routed to or from the appropriate processors 215 or 225, connected directly or indirectly to switch 250. In accordance to one embodiment, control software. The control software 1122 is preferably executed on a processor such as processor 215.

To accomplish the task of routing, control software 1122 monitors communication received from external interface 230 for a predetermined switching signal or sequence (e.g., a logic level). This predetermined switching signal can be transmitted after the start bit, for example. Detection of the switching signal is an indication that the route of communication is to be changed. Thus, for example, in one embodiment, if no switching signal is detected, then any data received through UART 260 from external interface 230 is forward to processor 215. Once control software 1122 detects the switching signal, however, then data is routed to chip 220 through UARTs 270 and 280 for processing by processor 225.

Alternatively, control software 1122 may monitor data transmission from chips 210 and 220 to external interface 230. For example, the control software may be implemented to route data processed by processor 215 to external interface 230 through UART 260, until a switching signal is received to indicate a change in the communication route. That is, upon detecting the switch signal or sequence control software 1122 causes the system to route data processed by processor 225 to external interface 230 via chip 210.

Figure 3A:
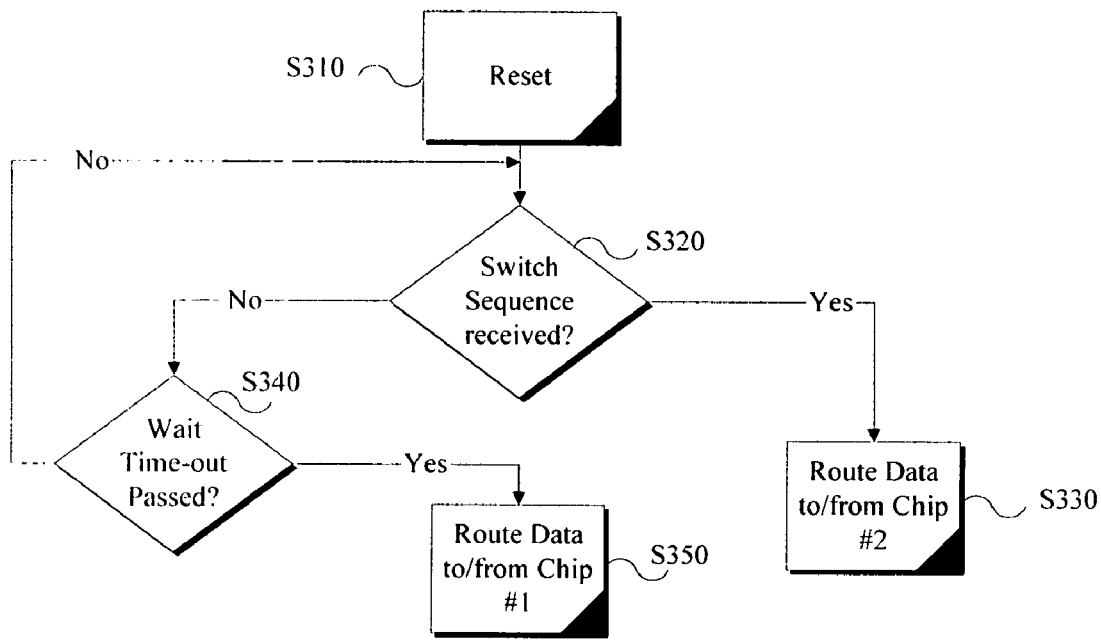
FIGS. 3A and 3B are flow diagrams of control methods for servicing multiple UARTs, in accordance with one or more embodiments.
Figure 3B:
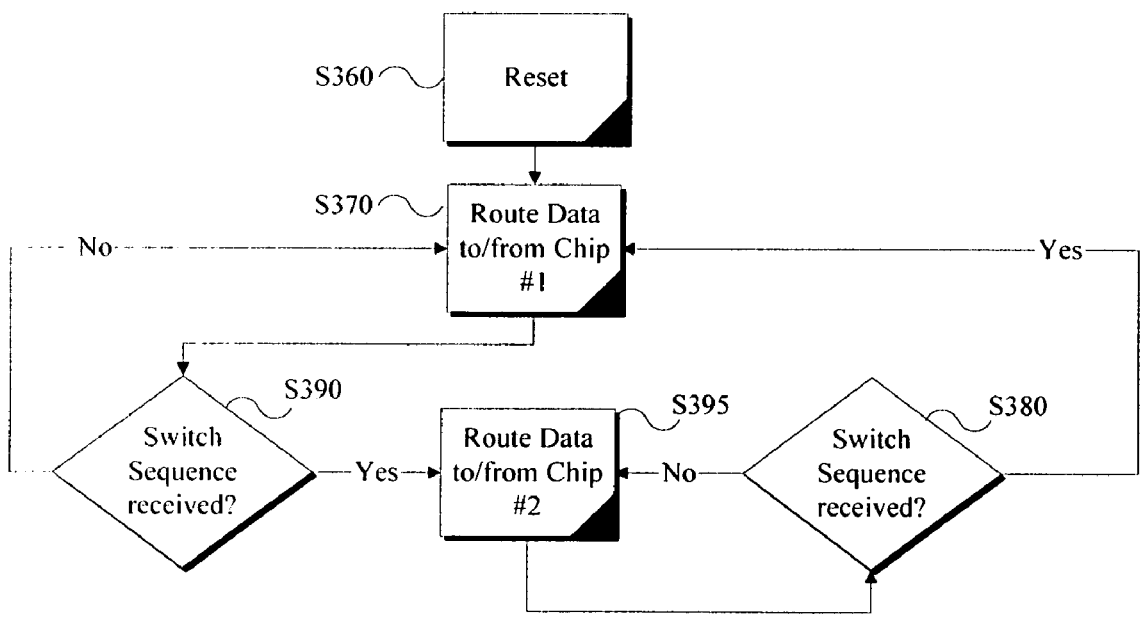

Referring to FIGS. 3A and 3B, two exemplary methods for controlling the flow of communication between chips 210, 220 and external interface 230 are provided. As illustrated in FIG. 3A, in accordance with one embodiment switch 250 in chip 210 is initially reset (S310) by control software 1122. Control software 1122 then monitors data communicated to UARTs 260 or 270 by either external interface 230 or UART 280 (of chip 220), respectively.

If a switch sequence or signal is received through either UART 260 or 270 (S320), then control software 1122 sets switch 250 to route data between chip 220 and external interface 230. Otherwise, the system waits until a time-out period has passed (S340) and routes data between chip 210 and external interface 230. That is, unless control software 1122 detects a switch signal, the data is communicated between chip 210 and external interface 230, by default.

Referring to FIG. 3B, in another embodiment, switch 250 in chip 210 is initially reset (S360) by control software 1122. In this embodiment, the default data communication route is also through chip 210; thus unless a switch sequence or signal is received data is routed between chip 210 and external interface 230 (S370). If a predetermined switch signal is received (S390), then data communications is routed to or from chip 220 (S395); otherwise, control software 1122 continues to route data communications to or from chip 210.

Control software 1122 continually monitors signals received from UARTs 260 and 280, while data communications is being routed between external interface 230 and chip 220. If a switch sequence or signal is received (S380), then control software 1122 switches back the data communication route to chip 210 (S370). As such, control software 1122 monitors data communications among the various UARTs in the system to avoid data collision and to ensure that data is communicated among the appropriate component at the proper time, without the need for a one-to-one relationship between the number of processors and external interfaces.

In some embodiments, the control, monitoring and switching functions is discussed above in relation to control software 1122 are implemented in hardware or a combination of hardware and software. As such, although control software 1122 is disclosed as applicable to the system of the present invention, this application is by way of example and shall not be construed to limit the scope of the invention to a software solution.

In embodiments of the system, mobile device 200 comprises a controlled system environment that can be presented largely in terms of hardware components and software code executed to perform processes that achieve the results contemplated by the system of the present invention. A more detailed description of such system environment is provided below with reference to FIGS. 4A and 4B.

As shown, a computing system environment is composed of two environments, a hardware environment 1110 and a software environment 1120. The hardware environment 1110 comprises the machinery and equipment that provide an execution environment for the software. The software provides the execution instructions for the hardware. It should be noted that certain hardware and software components may be interchangeably implemented in either form, in accordance with different embodiments of the invention.

Software environment 1120 is divided into two major classes comprising system software 1121 and control software 1122. System software 1121 comprises control programs, such as the operating system (OS) and information management systems that instruct the hardware how to function and process information. Control software 1122 is a program that performs a specific task such as monitoring the route of communication between the appropriate UARTs. In certain embodiments of the invention, system and application software are implemented and executed on one or more hardware environments, for example.

Figure 4A:
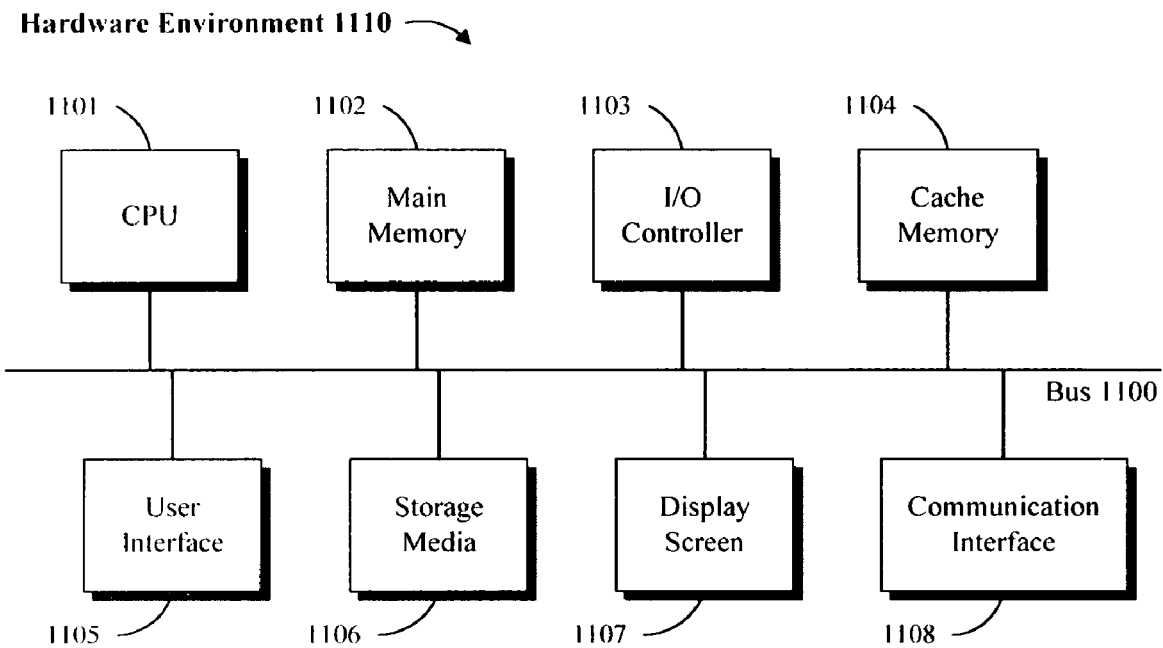
FIGS. 4A and 4B are block diagrams of hardware and software environments in which a system of the present invention may operate, in accordance with one or more embodiments.

Referring to FIG. 4A, an embodiment of the control software 1122 can be implemented as logic code in the form of computer readable code executed on a general purpose hardware environment 1110 that comprises a central processor unit (CPU) 1101, a main memory 1102, an input/output controller 1103, optional cache memory 1104, a user interface 1105 (e.g., keypad, pointing device, etc.), storage media 1106 (e.g., hard drive, memory, etc.), a display screen 1107, a communication interface 1108 (e.g., a wireless network card, a Blue tooth port, a wireless modem, etc.), and a system synchronizer (e.g., a clock, not shown in FIG. 4A).

Cache memory 1104 is utilized for storing frequently accessed information. A communication mechanism, such as a bi-directional data bus 1100, can be utilized to provide for means of communication between system components. Hardware Environment 1110 is capable of communicating with local or remote systems connected to a wireless communications network (e.g., a PAN or a WAN) through communication interface 1108.

In one or more embodiments, hardware environment 1110 may not include all the above components, or may include additional components for additional functionality or utility. For example, hardware environment 1110 can be a laptop computer or other portable computing device that can send messages and receive data through communication interface 1108. Hardware environment 1110 may also be embodied in an embedded system such as a set-top box, a personal data assistant (PDA), a wireless communication unit (e.g., cellular phone). or other similar hardware platforms that have information processing and/or data storage and communication capabilities. For example, in one or more embodiments of the system, hardware environment 1110 may comprise a PMG unit or an equivalent thereof In embodiments of the system, communication interface 1108 can send and receive electrical, electromagnetic, or optical signals that carry digital data streams representing various types of information including program code. If communication is established via a communications network, hardware environment 1110 may transmit program code through the network connection. The program code can be executed by central processor unit 1101 or stored in storage media 1106 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are memory cards, CD-ROM disks, ROM cards, floppy disks, magnetic tapes, computer hard drives, and network server systems.

In one or more embodiments of the invention, processor 1101 is a microprocessor manufactured by Motorola, Intel, or Sun Microsystems Corporations, for example. The named processors are for the purpose of example only. Any other suitable microprocessor, microcontroller, or microcomputer may be utilized.

Figure 4B:
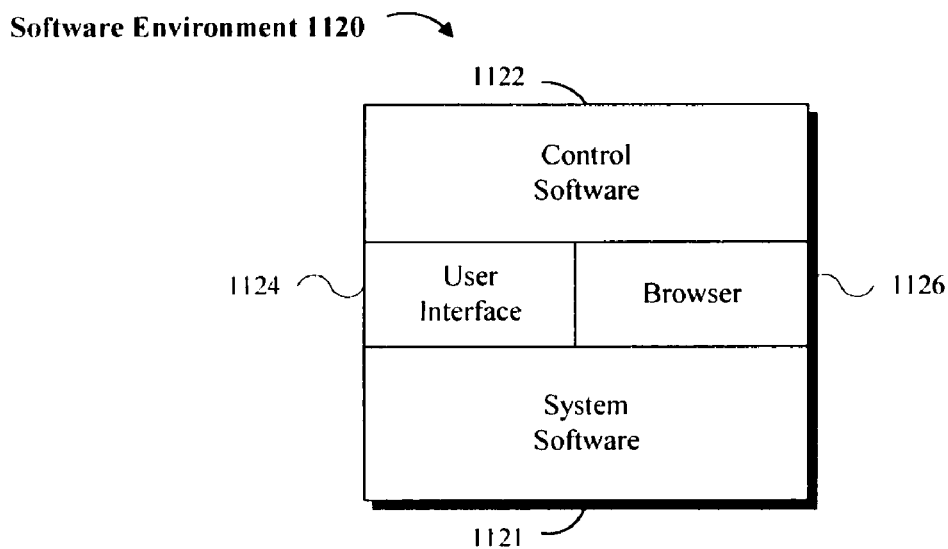

Referring to FIG. 4B, software 1120 or one or more of its components is stored in storage media 1106 and is loaded into memory 1102 prior to execution. Software environment 1120 comprises system software 1121 and control software 1122. Depending on system implementation, certain aspects of software environment 1120, and particularly control software 1122, can be loaded on one or more hardware environments 1110, or subcomponents thereof.

System software 1121 comprises software such as an operating system that controls the low-level operations of hardware environment 1110. Low-level operations comprise the management of the system resources such as memory allocation, file swapping, and other core computing tasks. In one or more embodiments of the invention, the operating system can be Nucleus, Microsoft Windows, Microsoft Windows, Macintosh OS, or IBM OS/2. However, any other suitable operating system may be utilized.

Control software 1122 can comprise one or more computer programs that are executed on top of system software 1121 after being loaded from storage media 1106 into memory 1102. In a client-server architecture, control software 1122 may comprise client software and/or server software. Referring to FIG. 1, for example in one embodiment of the invention, client software is executed on mobile devices 200 and server software is executed on device 300.

Software environment 1120 may also comprise web browser software 1126 for accessing content on a remote server. Further, software environment 1120 may comprise user interface software 1124 (e.g., a Graphical User Interface (GUI)) for receiving user commands and data. The received commands and data are processed by the software applications that run on the hardware environment 1110. The hardware and software architectures and environments described above are for purposes of example only. Embodiments of the invention may be implemented in any type of system architecture or processing environment.

Embodiments of the invention are described by way of example as applicable to systems and corresponding methods for controlling data communications between multiple UARTs in a mobile device. In this exemplary embodiment, logic code for performing these methods is implemented in the form of, for example, control software 1122. The logic code, in one embodiment, may be comprised of one or more modules that execute on one or more processors in a distributed or non-distributed communication model. For example, one or more embodiments of the present invention may comprise separate radio and baseband modules, or alternatively modules incorporating the radio, baseband, micro-controller and flash memory in a single-chip solution.

It should also be understood that the programs, modules, processes, methods, and the like, described herein are but exemplary implementations and are not related, or limited, to any particular computer, apparatus, or computer programming language. Rather, various types of general-purpose computing machines or customized devices may be used with logic code implemented in accordance with the teachings provided, herein. Further, the order in which the methods of the present invention are performed is purely illustrative in nature. These methods can be performed in any order or in parallel, unless indicated otherwise in the present disclosure.

The methods of the present invention may be performed in either hardware, software, or any combination thereof. In particular, some methods may be carried out by software, firmware, or macrocode operating on a single computer a plurality of computers. Furthermore, such software may be transmitted in the form of a computer signal embodied in a carrier wave, and through communication networks by way of Internet portals or websites, for example. Accordingly, the present invention is not limited to any particular platform, unless specifically stated otherwise in the present disclosure.

The present invention has been described above with reference to preferred embodiments. However, those skilled in the art will recognize that changes and modifications may be made in these preferred embodiments without departing from the scope of the present invention. Other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

The invention claimed is:

1. A method for controlling data communications between a first external interface of an electronic device and at least first and second chips both included in the electronic device, each of the first and second chips configured for communicating with the first external interface, the first chip having a first universal asynchronous receiver-transmitters (UART), a first microcontroller, and a switching mechanism capable of connecting the first UART and the first microcontroller, and the second chip having a second microcontroller and a second UART connecting the second microcontroller to the first UART, the method comprising:

monitoring signals communicated to the first chip from at least one of the first external interface and the second UART; and communicating data between the first external interface and the second microcontroller via the first and second UARTs without intervention of a second external interface of the electronic device, in response to the switching mechanism detecting a predetermined signal.

2. The method of claim 1, wherein the predetermined signal is a switch sequence received from at least one of the second UART and the first external interface.

3. The method of claim 1, further comprising:
communicating data between the first external interface and the first microcontroller, after the switching mechanism has detected that a time-out period has expired.

4. The method of claim 1, wherein the switching mechanism is implemented as control software executing over the first microcontroller.

5. A method for controlling data communications between a singular external interface for an electronic device and at least first and second microcontrollers included in the electronic device, each of the first and second chips configured for receiving data from and transmitting data to the external interface, wherein the first microcontroller is connectable to first and second universal asynchronous receiver-transmitters (UARTs), via a switch mechanism, and wherein the second microcontroller is respectively connected to a third UART, the method comprising;
communicating signals from the external interface to the first UART, wherein a switch mechanism monitors the signals for a predetermined signal; and
routing data from the external interface to the second microcontroller via the first, second and third UARTs without intervention of a secondary external interface of the electronic device, in response to the switch mechanism detecting the predetermined signal.

6. The method of claim 5, further comprising:
rerouting data from the external interface to the first microcontroller via the first UART, in response to the switch mechanism detecting the predetermined signal.

7. The method of claim 6, wherein the switch mechanism is implemented as control software executable on the first microcontroller for connecting the first UART to at least one of the first microprocessor and the second UART, respectively based on detecting the predetermined signal.

8. The method of claim 6, wherein the switch mechanism is implemented as a hardware switch connecting to first UART to at least one of the first microprocessor and the second UART, respectively based on detecting the predetermined signal.

9. The method of claim 6, wherein the switch mechanism is implemented partially in hardware and partially in software for connecting the first UART to at least one of the first microprocessor and the second UART, respectively based on detecting the predetermined signal.

10. An integrated computing system comprising:
an external interface for receiving and transmitting data between the computing system and an external device;
a first chip comprising a first UART, a second UART, a switch mechanism and a first microcontroller, wherein the first UART is in communication with the external interface and the first UART is connectable to the second UART and the first microcontroller via the switch mechanism; and
a second chip comprising a second microcontroller and a third UART connected directly between the second UART and the second microcontroller without intervention of a secondary external interface;
wherein the switch mechanism causes data to be routed between the second microcontroller and the external interface via the first, second and third UARTs, in response to detecting a first logic level.

11. The computing system of claim 10, wherein the switch mechanism causes data to be routed between the external interface and the first microcontroller via the first UART, in response to detecting a second logic level.

12. The computing system of claim 11, wherein the first and second logic levels have equal values.

13. The computing system of claim 10, wherein the switch mechanism is implemented in software.

14. The computing system of claim 10, wherein the switch mechanism is implemented in hardware.

15. The computing system of claim 10, wherein the switch mechanism is implemented in both software and hardware.

16. A method for controlling data communications, wherein data is communicated between an external interface and a second microcontroller included in a second chip, via first and second universal asynchronous receiver-transmitters (UARTs) included in a first chip, without intervention of a secondary external interface in response to a switching mechanism detecting a predetermined signal, the first chip is in communication with a second chip having a third UART, the method comprising:
monitoring signals communicated from the external interface to the first UART; and
routing data from the first UART to the third UART, via the second UART, in response to the switching mechanism detecting the predetermined signal.

17. The method of claim 16, further comprising:
monitoring signals communicated from the third UART to the second UART; and
routing data from the third UART to the first UART, via the second UART, in response to the switching mechanism detecting the predetermined signal.

* * * * *